Sept. 26, 1967  H. S. DAVIS  3,343,296

FISHING LURE

Filed June 22, 1965

INVENTOR

HERSCHEL S. DAVIS

BY Cameron, Kerkam & Sutton

ATTORNEYS

United States Patent Office 3,343,296
Patented Sept. 26, 1967

3,343,296
FISHING LURE
Herschel Samuel Davis, c/o Davis Rubber Company, P.O. Box 3774, 1600 E. 15th St., Little Rock, Ark. 72203
Filed June 22, 1965, Ser. No. 465,961
4 Claims. (Cl. 43—42.28)

This invention relates to a novel and improved fishing lure which is so formed as to have a remarkably lifelike appearance in the water and in which the hook member is so covered and concealed by the rearwardly extending body streamers that it will be prevented from hooking or entangling foreign objects in the water such as weeds, lily pads and so forth.

The lure which is the subject of this invention comprises broadly a horizontally disposed head bar means which consists of a rod member, to the extremities of which are applied metal spheres or balls which are appropriately centrally bored to receive the extremities of the rod or bar means whereby the head bar structure resembles a small "dumbbell," the balls simulating eyes in the head extremity of the lure. In one embodiment of the invention, as shown in FIGS. 1 and 2 of the drawings, a multiplicity of attenuated rubber strands or strands of nylon, bucktail or analogous material, which may be of any desired length, depending upon the size and length of lure desired, are laid out in a hank, which is then folded back on itself, the center bight of which is then applied over the rod of the head bar, between the terminal balls thereof, and folded rearwardly thereover. A rubber band, lashing or elastic sleeve means is then applied behind the head bar about the strands, immediately behind the head bar, to hold the head bar and strands in closely assembled condition with the extremities of the strands extending rearwardly from the head bar. This having been done, the eye or shank extremity of a hook is then inserted through the elastic sleeve or binding so that the bend of the hook lies within the rearward extremities of the strands and the eye thereof protrudes forwardly of the head bar, for attachment of the line or leader thereto.

Various embodiments of the invention are shown and will be discussed in more detail further on in this specification.

A number of patents were developed disclosing fishing lures including a plurality of rubber or analogous strands extending rearwardly therefrom to provide life-like appearance and motion to the lure in the water. However, none of these patents disclose applicant's novel head bar structure and his novel method of applying the strands thereover and maintaining them in position thereon to form the head and body of the lure.

A patent of particuluar interest is Gambill, Patent No. 2,546,437, of Mar. 27, 1951, which discloses a plurality of rubber strands including a centrally disposed tubular section, provided with an orifice at its center to be applied about the shank of a hook, a rubber ring being applied about the doubled strands beneath the tubular section thereof to maintain the strands in position on the shank of the hook. This patent, however, does not disclose applicant's head bar structure, nor other novel features of applicant's lure, as will hereinafter further be brought out.

It is a primary object of this invention to evolve a fishing lure of remarkably life-like appearance in the water and in which the strand-like body tendrils surround the hook, concealing it and protecting it from "snagging" on foreign objects in the water, which lure is composed of a novel head bar of "dumbbell" shape about which the strands are looped and behind which they are bound and maintained in permanent position by means of an encircling resilient wrapping or neck band holding them closely together behind the head bar.

It is a further object of this invention to provide such a lure which may be readily formed and which is simple in construction and susceptible of numerous embodiments.

Another object of this invention is to provide such a lure which is susceptible of being made in a wide range of sizes and color combinations and which is adaptable either to fresh or salt water use.

Other and further objects of this invention will become apparent as this specification proceeds.

Referring to the drawings, FIG. 1 is a perspective view of a preferred embodiment of the invention in which a treble hook is employed in the lure;

Figure 3:
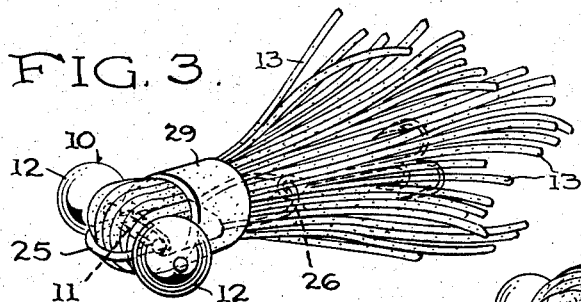
FIG. 3 is an alternative embodiment in which snap or clip means of conventional type are incorporated in the lure, passing through the ring or collar thereof with the strands disposed through its forward loop and about the head bar, the hook being held in the rear portion of the snap means.
Figure 7:
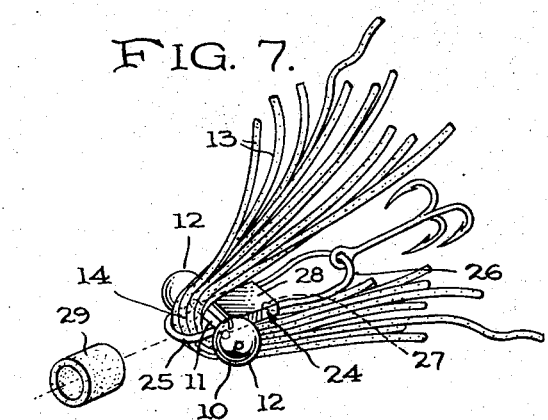
Figure 8:
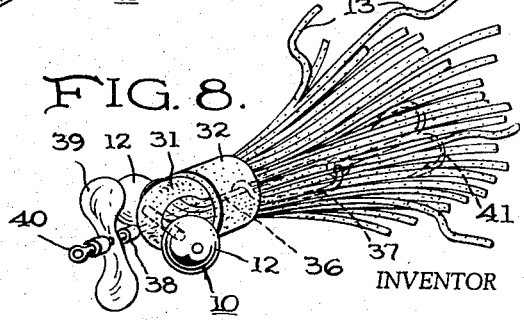

FIG. 7 is a partially exploded view of the embodiment of the invention shown in FIG. 3 showing the resilient strands in position through the forward eye of a fishing snap means, and about the head bar, extending rearwardly therefrom and with the resilient rubber band in position to be slipped thereover to assemble the lure and maintain it as a unit; and FIG. 8 is a perspective showing of another embodiment of the invention in which the strands are bound together at their center, or "bight" point and the head bar inserted through the binding and the strands are bound therebehind by a suitable rubber band or wrapping, through which the shank of a "single" snap is passed, the shank protruding outwardly of the head bar and being provided with a propeller-type spinner and an eye at its extremity for attachment of line or leader.

Figure 1:
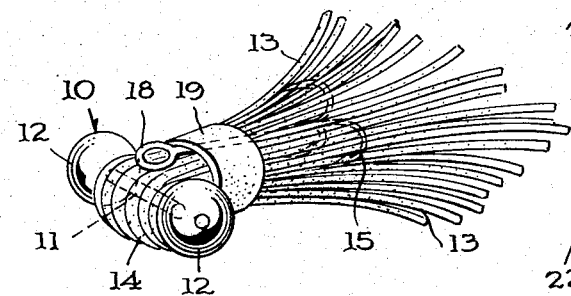
Figure 5:
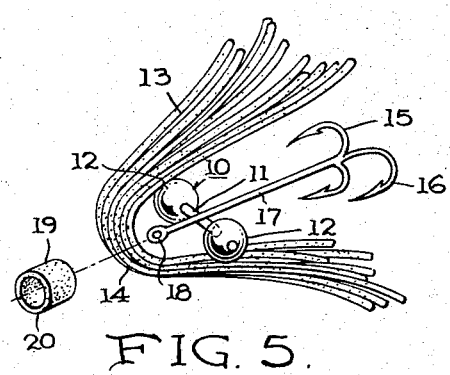
FIG. 5 is an exploded view showing a preferred method of assembling the embodiment of the lure shown in FIG. 1, showing the strands in looped condition about to be applied over the rod of the head bar between the terminal balls thereof and with the resilient collar or rubber band in position to be applied thereover after the strands are looped closely over the head bar.

In the drawings, referring specifically to FIGS. 1 and 5, it can be seen that the base or "foundation" of the lure lies in head bar 10 which is composed of a rod 11 over the lateral extremities of which are affixed spherical balls or eye pieces 12 which are preferably bored centrally for application over the extremities of rod 11 and which are permanently affixed thereover as by soldering, clamping or other appropriate means.

The length of rod 11 and the size of balls 12 may vary within wide limits, depending upon the size of the lure it is desired to produce, as will be further discussed.

For the average fresh water lure, rod 11 may be from ¼ to ½ inch in length and the diameter of balls 12 may vary between ⅛ to ¼ inch. For larger salt water lures, rod 11 may be increased in length up to 1 inch and balls 12 may be increased in size up to ½ inch in diameter. Obviously, the longer bar 11 and the larger balls 12 the greater the number and size of the strands which may be applied over rod 11.

As shown in particular in FIG. 5, a number of resilient rubber strands 13 or analogous strands of nylon, bucktail, twine or other appropriate material are preferably gathered in a hank which is folded into a bight 14 at its center, the bight 14 then being applied over the rod 11, between terminal balls 12 of the head bar 10. A fish hook 15 composed of terminal hook section 16, shank 17 and eye 18 may then be applied across the center of head bar 10 between terminal balls 12 thereof and the entire assembly of head bar 10, strands 13 and hook 15 is then held in unitary condition to receive a resilient sleeve or rubber band 19 which is expanded as by long nose pliers or other means and slid over head bar 10 to resiliently engage about strands 13 immediately behind head bar 10, bearing at its forward edge 20 against terminal balls 12 thereof. In assembling the lure, head bar 10 may be turned to an angle of 45° or more from its normal lateral position to facilitate passage of expanded rubber band 19 thereover.

Figure 2:
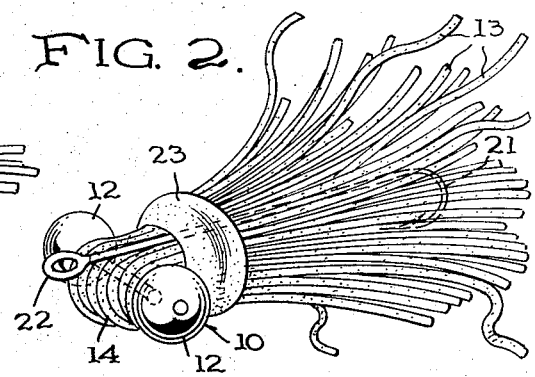
FIG. 2 is a slightly modified embodiment in which an enlarged rubber band or ring is utilized for holding the strands behind the head bar and a single hook is applied therethrough with its eye extending outwardly beyond the head bar.

As will be seen from FIGS. 1 and 2, with resilient band 19 in position about strands 13 behind head bar 10 and bearing closely thereagainst and with hook 15 applied therethrough with its eye 18 adjacent to or protruding ahead of head bar 10, the entire lure will be held in permanent and unitary condition and will comprise a strong, resilient and indestructible lure which will withstand the effect of strikes by the jaws of game fish and will be substantially immune to damage from forces met in normal usage.

With respect to resilient strands 13, as aforesaid, they may be of any desired length and diameter and may be composed of any desired material. Thus, if a lure of substantially 3 inches in length is desired, the minimum length of strands 13 should be 6½ to 7 inches, and their diameter or thickness about 1/16 inch, taking into consideration the shortening effect of bight 14 applied about head bar 10. If a lure for salt water use is to be formed, the strands should be more than twice as long as the desired final length of the lure and their diameter proportionately increased, i.e., if a lure of 8 inches in length is desired, strands 13 should be at least 17 inches long and ⅛ inch in diameter and the length of head bar 10 should be proportionately increased, as should the size of balls 12 at the extremities of head bar 10.

With further respect to the length of strands 13 it will be noted that while they may all be of the same length, it is desirable normally to vary the length of the strands, as shown in the drawings, to provide a plurality of longer inner strands extending rearwardly behind the outer "body" strands to provide a sinuous and life-like appearance in the water.

As aforesaid, the preferred material for these strands is rubber, on the order of 1/16 inch in diameter, in the smaller lures, which imparts a "moving" or life-like vibratory action to the strand body of the lure. However, bucktail or nylon strands or strands of analogous, semi-resilient material may also be utilized.

Referring now to the various embodiments of the lure shown in the drawings, in FIG. 2 a lure is shown which is substantially identical to that illustrated in FIG. 1, with the exception that the fishhook 21 is a "single" hook, with its eye 22 protruding forwardly of the head bar 10 and rubber band or collar 23 is of rounded or enlarged configuration to simulate a neck-like enlargement behind the head bar 10 of the lure. In all other respects the lure shown in FIG. 2 is identical in construction and manner of assembly to that shown in FIGS. 1 and 5.

It will be understood that in all embodiments of the lure various types of wrappings or bindings, such as a wrapping of twine, thread or resilient cord, may be substituted for the rubber band means applied over the strands 13, behind head bar 10.

A further embodiment of the lure is shown in FIGS. 3 and 7. In this embodiment, a double snap 24 of conventional form comprising a small forward loop 25 and an elongate rear loop 26 is provided with a hooked extremity 27 which snaps into body 28 of the snap to permit opening and closing of rear loop 26. In this embodiment, strands 13 are laid out in a hank and doubled back over themselves into bight 14. They are then pulled through the forward loop 25 of snap 24, folded rearwardly thereover and head bar 10 is inserted into the bight 14 of strands 13 over forward loop 25 of snap 24. Rubber band or collar 29 is then applied over head bar 10, strands 13 and the center portion of snap 24.

As previously indicated, resilient band 29 may be expanded or opened by means of the insertion of a pair of long nose pliers therein and head bar 10 may be turned into position to lie substantially along the longitudinal axis of snap 24 while the expanded rubber band 29 is being applied thereover and over strands 13 and loop 25 of snap 24. With resilient sleeve 29 thus in position, as shown in FIG. 3, head bar 10 is released and will resume its proper lateral position at right angles to the axis of the snap 24.

As the rear loop 26 of snap 24 is openable it will be seen that the hook used in this embodiment of the invention may be changed at will.

Figure 4:
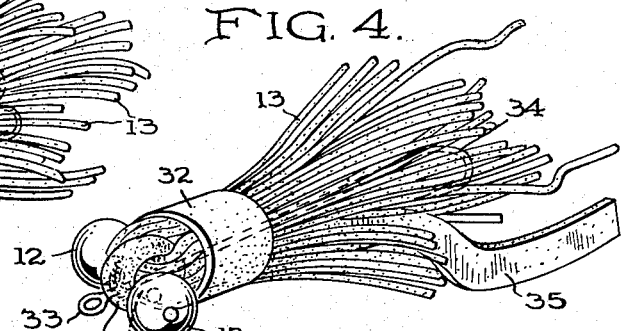
FIG. 4 is a further embodiment in which the strands are centrally bound together by a resilient rubber ring or other means, through which the head bar is passed at right angles, the resilient collar or binding being then applied thereover, behind the ring and head bar to maintain the strands in position behind the head bar.
Figure 6:
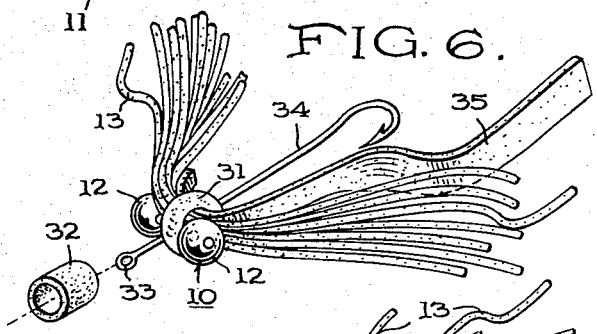
FIG. 6 is a partially exploded view of the embodiment of the invention shown in FIG. 4 with the strands and head bar in position through the rubber ring means and the resilient neck band in position to be slipped thereover, to assemble the lure.

A further embodiment of the invention is shown in FIGS. 4 and 6. In this embodiment of the invention strands 13 are first formed in a hank and are inserted through the expanded resilient rubber band or ring 31, which binds them closely into two sections of equal length. Head bar 10 is then inserted through ring 31 so that balls 12 thereof are disposed equidistant on each side of ring 31. Resilient band or collar 32 is then opened by means of long nose pliers or other means inserted therein, head 10 is turned and slid therethrough, ring 31 also passing through open resilient sleeve 32, which is then allowed to contract behind head bar 10 and ring 31 in the position shown in FIG. 4 of the drawings to maintain this embodiment in integral condition. The eye 33 of hook 34 is then pushed through contracted band 32 into the position shown in FIG. 4 whereby the eye 33 of the hook 34 protrudes forwardly of head bar 10 and the bend and barb of the hook 34 are disposed within the rear extremities of resilient strands 13, as shown in FIG. 4.

This embodiment is so designed that a larger hank of strands may be used with a small head bar, as only the band 31 passes around the head bar, the bight of the hank of strands being held therein against the head bar and not passed over the head bar.

An additional elongate trailer piece 35 may also be used in this embodiment, its forward extremity being applied through ring 31 with strands 13, as shown. This elongate white trailer piece lends additional attracting properties to the lure.

A further embodiment of the invention is shown in FIG. 8 and is quite analogous to the embodiment shown in FIGS. 4 and 6 save for the fact that in place of single hook 34 a long shank clip member 36 is utilized provided at its rear extremity with a safety pin type connector section 37 and at its forward extremity, ahead of head bar 10 is provided with sleeves 38 and propeller blade 39. Eye 40 is provided at the forward extremity of the shank of clip 36 for the attachment of line or leader thereto. Hook 41 is provided in clip 37 concealed within strands 13 of this embodiment of the lure. The manner of assembly of this embodiment is identical to that discussed for the embodiment shown in FIGS. 4 and 6, save for the fact that long shank clip 36 is inserted from the forward extremity of the lure and pushed rearwardly through strands 13 and collar 32, prior to the attachment of the hook 41 to the clip 37 at its rearward extremity.

As had been previously indicated, the size and weight of lures made in conformity with this invention may vary widely. The lure may be reduced in size to the smallest fly rod type lure of about 1 inch in length, or increased in size so as to be susceptible for use on the largest salt water game fish, as has been indicated, the width of the head bar 10 may be increased and the thickness and length of the rubber strands 13 may be increased, if a larger lure is required. Obviously, the larger the lure the larger will be the hook provided within it.

The present lure has a very life-like action in the water, due to the resiliency of the strands 13 which make up the body and tail extremities of the lure and is substantially weedless and highly effective on most fresh and salt water game fish.

If desired, strands of varying colors may be used, or the strands may be all one color, i.e., white, red, black or other desired color, or they may be multi-colored.

Where a lure of the "Japanese feather" type is desired the strands will usually be white.

The basic and fundamental novel concept behind the invention is that of laying the strands over the head bar, between the terminal balls thereof, and binding them closely therebehind by means of a resilient band or wrapping applied behind the head bar and resiliently encasing the strands therebehind.

As a modification of this concept, the alternate clip and ring embodiments of the invention are shown, both of which employ the same basic principle.

The lure evolved is one which is readily formed, it is economical to make and requires no special tools for its construction. Further, it provides a most effective and life-like lure in the water and one which is substantially weedless.

As has been indicated, the length and thickness of the strands 13 and the width of the head bar 10 determine the size of the lure produced.

Modifications in details of construction may be made without departing from the spirit of the invention.

Attention is directed to the appended claims for a limitation of its scope.

What is claimed is:

1. In a fishing lure, a laterally disposed head bar, balls disposed at the extremities of said head bar, a hank of resilient strands doubled over said head bar between said balls and extending rearwardly therefrom, binding means disposed over said strands behind said head bar and holding said strands closely together thereover and a fishhook disposed within said strands with its shank and eye extending outwardly through said binding means and over said head bar.

2. In a fishing lure a head bar comprising a rod provided with balls at its extremities, a hank of resilient strands held together at their center section doubled over said rod between said balls, resilient binding means applied over said strands behind said head bar binding said strands closely together behind said head bar and a fishhook disposed within said strands and held adjacent its forward extremity within said resilient binding means.

3. A lure in accordance with claim 1 wherein said strands are of varied length.

4. In a fishing lure, a head bar comprising a rod provided with balls at its extremities, a hank of resilient strands bound at their center bight by a binding through which said head bar is passed, binding means binding said hank of resilient strands behind said head bar and a fish-hook disposed through said binding means with its shank protruding forwardly of said head bar.

References Cited

UNITED STATES PATENTS

| | | | |
|---|---|---|---|
| 1,893,686 | 1/1933 | Schilpp | 43—42.28 X |
| 2,546,437 | 3/1951 | Gambill | 43—42.28 |

SAMUEL KOREN, *Primary Examiner.*

D. J. LEACH, *Assistant Examiner.*